Figure 1:
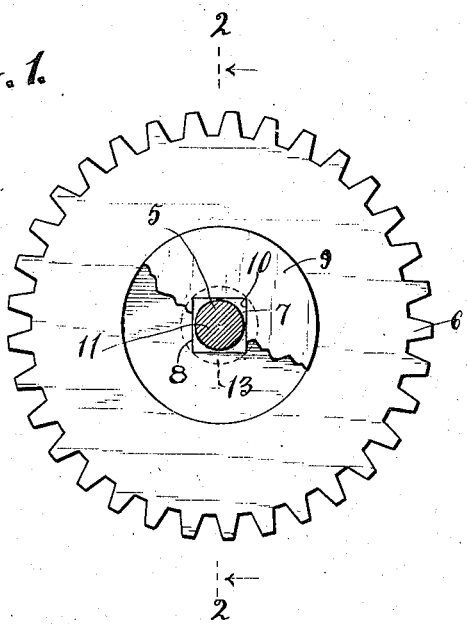

C. H. STANGE.
NOISELESS GEAR WHEEL.
APPLICATION FILED JUNE 12, 1915.

1,235,734.

Patented Aug. 7, 1917.

INVENTOR
Charles H. Stange.
By Morsell, Keeney & French.
ATTORNEYS.

UNITED STATES PATENT OFFICE.

CHARLES H. STANGE, OF MERRILL, WISCONSIN.

NOISELESS GEAR-WHEEL.

1,235,734.                Specification of Letters Patent.        Patented Aug. 7, 1917.

Application filed June 12, 1915. Serial No. 33,679.

*To all whom it may concern:*

Be it known that I, CHARLES H. STANGE, a citizen of the United States, and resident of Merrill, in the county of Lincoln and State of Wisconsin, have invented new and useful Improvements in Noiseless Gear-Wheels, of which the following is a description, reference being had to the accompanying drawings, which are a part of this specification.

This invention relates to improvements in noiseless gear wheels.

In the use of gears and pinions in many devices requiring only the transmission of minimum power such as in speedometers and other like devices the noise caused by the intermeshing gears is objectionable in many cases and furthermore in the event of any foreign matter getting between the gears, the device is either stopped or the gears are broken.

It is one of the objects of the present invention to overcome the before mentioned objectionable features and provide a gear wheel which is practically noiseless and which will permit foreign matter to pass between two gears without stopping or breaking the gears.

A further object of the invention is to provide a noiseless gear wheel which will work quietly even though the gear shafts are not in axial alinement.

A further object of the invention is to provide a noiseless gear wheel which is of simple construction, is strong and durable and is well adapted for the purpose described.

With the above and other objects in view the invention consists of the improved noiseless gear and its parts and combinations as set forth in the claims and all equivalents thereof.

Figure 2:
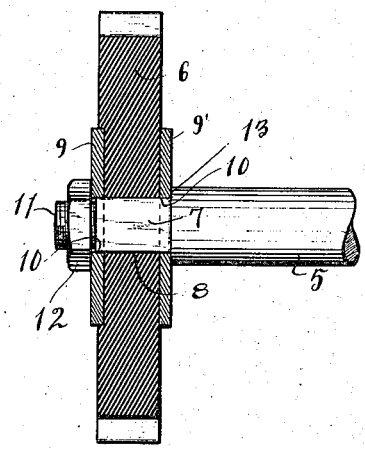

In the accompanying drawing in which the same reference characters indicate the same parts in all of the views:

Fig. 1 is a front view of the improved noiseless gear wheel shown mounted upon a shaft, parts being broken away to show interior construction; and Fig. 2 is a vertical sectional view taken on line 2—2 of Fig. 1.

Referring to the drawing the numeral 5 indicates a portion of a shaft upon which the improved gear or wheel 6 is mounted and turns therewith. The shaft is provided with a squared end portion 7 which extends through a correspondingly shaped opening 8 in the gear wheel 6. Washers or disks 9 and 9' positioned on opposite sides of the gear wheel are also provided with square openings 10 through which the squared shaft portion extends. The outer end portion 11 of the shaft is threaded and is provided with a nut 12 which firmly clamps the gear wheel and the washers to the shaft between the nut and the shoulder 13 formed on the shaft. The washer 9 is partly embedded in the gear wheel.

The gear wheel is formed of rubber or other like yielding elastic material which is sufficiently firm to transmit light power and which will yield to permit foreign matter to pass between intermeshing gears without injuring the teeth or other parts thereof. The washers are preferably formed of metal and the wheel member is tightly clamped therebetween in order to fixedly secure the wheel member to the shaft and prevent its rotation thereon.

The invention also contemplates the omission of the teeth of the gear and the use of the rubber wheel as a friction driving means. It is also to be understood that the gear wheel may be provided with a round instead of a square bore when it is desired to revolubly mount the wheel upon a shaft.

From the foregoing description it will be seen that the yielding material will form a noiseless transmission means and that the construction is very simple and well adapted for the purpose described.

What I claim as my invention is:

A noiseless gear wheel, comprising a shaft having a squared portion and a shoulder and a threaded portion, a gear wheel member formed of soft rubber and having a squared bore, washers mounted on the opposite sides of the wheel member and having squared openings which register with the bore of the member, the squared portion of the shaft extending through the bore and the washers and the shaft shoulder bearing against one of the washers, and a nut threaded on the shaft end for clamping the wheel member and the washers between the shoulder and the nut.

In testimony whereof, I affix my signature, in presence of two witnesses.

CHARLES H. STANGE.

Witnesses:
M. H. McDONNELL,
N. E. KNUDSON.